US012063489B2

(12) United States Patent
Ruwisch

(10) Patent No.: US 12,063,489 B2
(45) Date of Patent: Aug. 13, 2024

(54) SIGNAL PROCESSING METHODS AND SYSTEMS FOR BEAM FORMING WITH WIND BUFFETING PROTECTION

(71) Applicant: Analog Devices International Unlimited Company, Limerick (IE)

(72) Inventor: Dietmar Ruwisch, Berlin (DE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 17/571,483

(22) Filed: Jan. 8, 2022

(65) Prior Publication Data

US 2022/0132247 A1 Apr. 28, 2022

Related U.S. Application Data

(63) Continuation of application No. PCT/EP2020/069607, filed on Jul. 10, 2020.

(30) Foreign Application Priority Data

Jul. 10, 2019 (EP) .................................... 19185507

(51) Int. Cl.
*H03G 9/00* (2006.01)
*G10L 21/0216* (2013.01)
(Continued)

(52) U.S. Cl.
CPC ............ *H04R 3/04* (2013.01); *G10L 21/0216* (2013.01); *H04R 3/005* (2013.01); *H04R 5/027* (2013.01);
(Continued)

(58) Field of Classification Search
CPC .......... H04R 3/04; H04R 3/005; H04R 5/027; H04R 5/04; G10L 21/0216; G10L 2021/02165
(Continued)

(56) References Cited

U.S. PATENT DOCUMENTS 6,683,961 B2 1/2004 Ruwisch
6,820,053 B1 11/2004 Ruwisch
(Continued)

FOREIGN PATENT DOCUMENTS

CN 1851806 10/2006
DE 10043064 3/2002
(Continued)

OTHER PUBLICATIONS

Grimm et al., Wind Noise Reduction For a Closely Spaced Microphone Array in a Car Environment, EURASIP Journal on Audio, Speech, and Music Processing (2018), 9 pages. (Year: 2018).*
(Continued)

*Primary Examiner* — Ammar T Hamid
(74) *Attorney, Agent, or Firm* — ARENTFOX SCHIFF LLP

(57) ABSTRACT

A method and apparatus are provided for generating a directional output signal from sound received by at least two microphones arranged as microphone array. The method includes transforming the sound received by each of said microphones and represented by analog-to-digital converted time-domain signals provided by each of said microphones into corresponding complex-valued frequency-domain microphone signals each having a frequency component value for each of a plurality of frequency components, calculating, for each of the plurality of frequency components, real-valued Wind Reduction Factors as minima of the reciprocal and non-reciprocal frequency components of a plurality of real-valued Deviation Spectra if said minimum is below a preselected deviation threshold and set to one if said minimum is above or equal to said deviation threshold, and for each of the plurality of frequency components, forming a frequency-domain wind-reduced output signal.

20 Claims, 4 Drawing Sheets

(51) Int. Cl.

| | |
|---|---|
| ***H04R 3/00*** | (2006.01) |
| ***H04R 3/04*** | (2006.01) |
| ***H04R 5/027*** | (2006.01) |
| ***H04R 5/04*** | (2006.01) |

(52) U.S. Cl.
CPC ...... *H04R 5/04* (2013.01); *G10L 2021/02165* (2013.01)

(58) Field of Classification Search
USPC ...................................................... 381/96, 98
See application file for complete search history.

(56) References Cited

U.S. PATENT DOCUMENTS

| | | | |
|---|---|---|---|
| 7,327,852 | B2 | 2/2008 | Ruwisch |
| 7,522,737 | B2 | 4/2009 | Solderits |
| 7,885,420 | B2 | 2/2011 | Hetherington et al. |
| 8,477,964 | B2 | 7/2013 | Ruwisch |
| 9,330,677 | B2 | 5/2016 | Ruwisch |
| 9,813,833 | B1 | 11/2017 | Vesa |
| 10,506,356 | B2 | 12/2019 | Walser et al. |
| 2003/0179888 | A1 | 9/2003 | Burnett et al. |
| 2005/0195988 | A1 | 9/2005 | Tashev et al. |
| 2007/0050161 | A1 | 3/2007 | Taenzer et al. |
| 2007/0263847 | A1 | 11/2007 | Konchitsky |
| 2008/0232607 | A1 | 9/2008 | Tashev et al. |
| 2009/0097670 | A1 | 4/2009 | Jeong et al. |
| 2009/0136057 | A1 | 5/2009 | Taenzer |
| 2011/0015931 | A1 | 1/2011 | Kawahara et al. |
| 2011/0038489 | A1 | 2/2011 | Visser et al. |
| 2011/0257967 | A1 | 10/2011 | Every et al. |
| 2012/0121100 | A1 | 5/2012 | Zhang et al. |
| 2013/0117016 | A1 | 5/2013 | Ruwisch |
| 2014/0193000 | A1 | 7/2014 | Ruwisch |
| 2015/0016629 | A1 | 1/2015 | Kanamori et al. |
| 2016/0050488 | A1 | 2/2016 | Matheja et al. |
| 2017/0337932 | A1 | 11/2017 | Iyengar et al. |
| 2017/0347206 | A1 | 11/2017 | Pedersen et al. |
| 2019/0364492 | A1 | 11/2019 | Azizi et al. |

FOREIGN PATENT DOCUMENTS

| | | | |
|---|---|---|---|
| DE | 19948308 | | 5/2002 |
| DE | 102004005998 | | 5/2005 |
| DE | 102010001935 | | 1/2012 |
| EP | 1571875 | A2 | 9/2005 |
| EP | 2752848 | | 7/2014 |
| JP | 2007336232 | A | 12/2007 |
| WO | 2003043374 | | 5/2003 |
| WO | 2006041735 | | 4/2006 |

OTHER PUBLICATIONS

Simon Grimm et al. "Wind noise reduction for a closely spaced microphone array in a car environment", EURASIP Journal on Audio, Speech, and Music Processing, Biomed Central Ltd, London, UK, vol. 2018, No. 1, Jul. 27, 2018 (Jul. 27, 2018), pp. 1-9, DOI: 10/1186/S13636-018-0130-Z (Year: 2018).*

Abstract in English for CN1851806, 1 page.

International Search Report and Written Opinion dated Nov. 12, 2020 in PCT/EP2020/069607, 18 pages.

Grimm et al., *Wind Noise Reduction For a Closely Spaced Microphone Array in a Car Environment*, EURASIP Journal on Audio, Speech, and Music Processing (2018), 9 pages.

Extended European Search Report in EP19185498.3, mailed Jan. 8, 2020, 8 pages.

Extended European Search Report in EP19185502.2, mailed Jan. 8, 2020, 7 pages.

Extended European Search Report in EP19185507.1, mailed Jan. 8, 2020, 10 pages.

Extended European Search Report in EP19185513.9, mailed Dec. 2, 2019, 9 pages.

Extended European Search Report in EP19185514.7, mailed Jan. 24, 2020, 7 pages.

International Search Report and Written Opinion in PCT/EP2020/069592, mailed Sep. 23, 2020, 13 pages.

International Search Report and Written Opinion in PCT/EP2020/069599, mailed Dec. 2, 2020, 13 pages.

International Search Report and Written Opinion in PCT/EP2020/069617, mailed Aug. 17, 2020, 17 pages.

International Search Report and Written Opinion in PCT/EP2020/069621, mailed Sep. 18, 2020, 12 pages.

Takahashi et al., "Structure Selection Algorithm for Less Musical-Noise Generation in Integration Systems of Beamforming and Spectral Subtraction," IEEE/SP 15th Workshop on Statistical Signal Processing, 2009, pp. 701-704.

* cited by examiner

SIGNAL PROCESSING METHODS AND SYSTEMS FOR BEAM FORMING WITH WIND BUFFETING PROTECTION

PRIORITY APPLICATIONS

This patent application is a bypass continuation application of International Patent Application No. PCT/EP2020/069607 (filed on 10 Jul. 2020), which claims priority to European Patent Application No. 19185507.1 (filed on 10 Jul. 2019). Both patent applications are incorporated herein by reference in their entirety.

FIELD OF TECHNOLOGY

The present invention generally relates to noise reduction methods and apparatus generating spatially focused audio signals from sound received by one or more communication devices. More particular, the present invention relates to methods and apparatus for generating a directional output signal from sound received by at least two microphones arranged as microphone array with small microphone spacing.

BACKGROUND

Hands-free telephony installations, especially in an environment like a running vehicle, unavoidably pick up environmental noise, because of the considerable distance between sound signal source (speaking person's mouth) and microphone(s). This leads to a degradation of communication comfort. Several methods are known to improve communication quality in such use cases. Normally, communication quality is improved by attempting to reduce the noise level without distorting the voice signal. There are methods that reduce the noise level of the microphone signal by means of assumptions about the nature of the noise, e.g. continuity in time. Such single-microphone methods as disclosed e.g. in German patent DE 199 48 308 C2 achieve a considerable level of noise reduction. Other methods as disclosed in US 2011/0257967 utilize estimations of the signal-to-noise ratio and threshold levels of speech loss distortion. However, the voice quality of all single-microphone noise-reduction methods degrades if there is a high noise level, and a high noise suppression level is applied.

Other methods use one or more additional microphone(s) for further improving of the communication quality. Different geometries can be distinguished, either with rather big distances (>10 cm) or with smaller distances (<3 cm) between the microphones arranged as a small-spaced array in the latter case. In this case the microphones pick up the voice signal in a rather similar manner and there is no principle distinction between the microphones. Such methods as disclosed, e.g., in German patent DE 10 2004 005 998 B3 require information about the expected sound source location, i.e. the position of the user's mouth relative to the microphones, since geometric assumptions are required as basis of such methods.

Further developments are capable of in-system calibration, wherein the algorithm applied is able to cope with different and a-priori unknown positions of the sound source. However, such calibration process requires noise-free situations to calibrate the system as disclosed, e.g., in German patent application DE 10 2010 001 935 A1 or U.S. Pat. No. 9,330,677.

If the microphones are mounted with bigger spacing, they are usually positioned in a way that the level of voice pick-up is as distinct as possible, i.e. one microphone faces the user's mouth, the other one is placed as far away as possible from the user's mouth, e.g. at the top edge or back side of a telephone handset. The goal of such geometry is a great difference of voice signal level between the microphones. The simplest method of this kind just subtracts the signal of the "noise microphone" (away from user's mouth) from the "voice microphone" (near user's mouth), taking into account the distance of the microphones. However since the noise is not exactly the same in both microphones and its impact direction is usually unknown, the effect of such a simple approach is poor.

More advanced methods use a counterbalanced correction signal generator to attenuate environmental noise cf., e.g., US 2007/0263847. However, a method like this cannot be easily expanded to use cases with small-spaced microphone arrays with more than two microphones.

Other methods try to estimate the time difference between signal components in both microphone signals by detecting certain features in the microphone signals in order to achieve a better noise reduction results, cf., e.g., WO 2003/043374 A1. However, feature detection can get very difficult under certain conditions, e.g. if there is a high reverberation level. Removing such reverberation is another aspect of 2-microphone methods as disclosed, e.g., in WO2006/041735 A2, in which spectra-temporal signal processing is applied.

In US 2003/0179888 a method is described that utilizes a Voice Activity Detector for distinguishing Voice and Noise in combination with a microphone array. However, such an approach fails if an unwanted disturbance seen as noise has the same characteristic as voice, or even is an undesired voice signal.

U.S. Ser. No. 13/618,234 discloses an advanced Beam Forming method using small spaced microphones, with the disadvantage that it is limited to broad-view Beam Forming with not more than two microphones.

Wind buffeting caused by turbulent airflow at the microphones is a common problem of microphone array techniques. Methods known in the art that reduce wind buffeting, e.g. U.S. Pat. No. 7,885,420 B2, operate on single microphones, not solving the array-specific problems of buffeting.

All methods grouping more than one microphone to a small-spaced microphone array and carrying out mathematical operations on the plurality of microphone signals rely on almost identical microphones. Tolerances amongst the microphones of an array lead to differences in sensitivity, frequency response, etc. and tend to degrade the precision of the calculations, or are even capable of producing wrong processing results.

Beam Forming microphone arrays usually have a single Beam Focus, pointing to a certain direction, or they are adaptive in the sense that the focus can vary during operation, as disclosed, e.g., in CN 1851806 A.

SUMMARY

It is therefore an object of the present disclosure to provide methods and systems with improved noise reduction techniques.

Known methods for Beam Forming with microphone-arrays with small spacing often get problems if non-acoustic noise is present in one or more of the microphone signals such as caused by wind turbulences hitting the microphone array. Such a noise problem is often referred to as wind-buffeting. Microphone signals caused by wind buffeting cannot be easily removed from a single microphone signal, and such signal components are capable of strongly disturbing the performance of Beam Forming with a microphone array. Wind-buffeting is known to be a bigger problem for uni-directional microphone installations than for an omni-directional microphone.

It is therefore in particular an object of the present disclosure to provide improved noise reduction techniques protecting against wind-buffeting in Beam Forming solutions utilizing microphone arrays.

One general aspect of the improved techniques includes methods and apparatus of Beam Forming using at least one microphone array with improved robustness against wind-buffeting.

Another general aspect of the improved techniques includes methods and apparatus with the ability to automatically compensate microphone tolerances in a Beam Forming application.

According to a first aspect, there is provided a method for generating a output signal from sound received by at least two microphones arranged as microphone array, said output signal is wind-buffeting reduced which is also called having wind-buffeting reduction. The method comprises the steps of transforming the sound received by each of said microphones and represented by analog-to-digital converted time-domain signals provided by each of said microphones into corresponding complex-valued frequency-domain microphone signals each having a frequency component value for each of a plurality of frequency components. The method further comprises calculating from the complex-valued frequency-domain microphone signals fora desired or selected Beam Focus Direction a Wind Reduction Spectrum. Said Wind Reduction Spectrum comprises, for each of the plurality of frequency components, a time-dependent, real-valued Wind Reduction factor, multiplying, for each of the plurality of frequency components, said Wind Reduction factor with the frequency component value of the complex-valued frequency-domain microphone signal of one of said microphones to obtain a wind-reduced frequency component value, and forming a frequency-domain output signal from the wind-reduced frequency component values for each of the plurality of frequency components. According to this aspect, there is provided a robust method for attenuating disturbances caused by wind-buffeting in the microphones forming the microphone array.

According to another aspect, the method further comprises to synthesize a time-domain wind-reduced output signal from the frequency-domain wind-reduced output signal by means of inverse transformation. According to this aspect, there is provided a time-domain output signal for further processing.

According to another aspect, the method further comprises calculating a plurality of real-valued Deviation Spectra, wherein, for each of the plurality of frequency components, each frequency component value of a Deviation Spectrum of said plurality of real-valued Deviation Spectra is calculated by dividing the magnitude value of a frequency-domain reference signal by the magnitude value of the complex-valued frequency-domain microphone signal of said microphone, and then said Wind Reduction Factors are calculated as minima over the reciprocal and non-reciprocal frequency components of said Deviation Spectra. According to this aspect, there is provided a minimum selection amongst reciprocal and non-reciprocal values of said Deviation Spectra components which is used as a robust and efficient measure to calculate Wind Reduction factors, which reduce signal disturbances caused by wind buffeting into the microphones. Thus, there is provided a wind noise reduction method for a microphone array being implemented in an algorithmically simple manner.

According to another aspect, the method further comprises calculating for each of the plurality of frequency components, real-valued Beam Spectra values from the complex-valued frequency-domain microphone signals for a selected Beam Focus Direction by means of predefined, microphone-specific, time-constant, complex-valued Transfer Functions. For each of the plurality of frequency components, said Beam Spectra values are used as arguments of a Characteristic Function with values preferably between zero and one, providing Beam Focus Spectrum values for a selected Beam Focus Directions and forming Beam Focus Spectra from the Beam Spectrum values for a desired Beam Focus Direction. Function values of the Characteristic Function are always positive values and preferably do not exceed the value one. With values between zero and one, the function values serve to limit the Beam Spectrum values to form respective Beam Focus Spectrum values for the desired Beam Focus Direction. Hence, according to an embodiment, the Characteristic Function works as limiting function, wherein details of the transition from zero to one define the angular characteristic of the resulting Beam Focus. The overall purpose of the Function is the limitation to one which avoids unwanted amplification of signal components at certain frequencies. According to this aspect, there is provided an even more robust and improved Beam Forming method with improved signal-to-noise ratio since restricting the Beam Focus Spectra to values between zero and one by means of the Characteristic Function avoids the degradation of the signal-to-noise ratio known in prior art Beam Forming methods.

According to another aspect, each of the Beam Focus Spectrum values comprises a respective attenuation factor. According to this aspect, there is provided simple and robust technique allowing to damp each frequency component by a respective attenuation factor.

According to another aspect, the method further comprises calculating a linear combination of the microphone signals of said microphones and wherein, in the multiplying step, the attenuation factor is multiplied with the frequency component value of the complex-valued frequency-domain microphone signal of the linear combination of the microphone signals. According to this aspect, the microphone signal is a frequency-domain signal of a sum or mixture or linear combination of signals of more than one of the microphones of an array, and not just the respective signal of one microphone so that signal-to-noise ratio can be improved.

According to another aspect, the method further comprises that, for each of the plurality of frequency components, the Beam Focus Spectrum value is multiplied with the frequency component value of the complex-valued frequency-domain microphone signal of one of said microphones to obtain the directional frequency component value. According to this aspect, there is provided a frequency component specific directional microphone signal processing.

According to another aspect, the method further comprises calculating, for each of the plurality of frequency, components of the complex-valued frequency-domain microphone signal of at least one of said microphones, a respective tolerance compensated frequency component value by multiplying the frequency component value of the complex-valued frequency-domain microphone signal of said microphone with a real-valued correction factor, wherein, for each of the plurality of frequency components, said real-valued correction factor is calculated as temporal average of frequency component values of said Deviation Spectra, and each of the Beam Focus Spectra for the desired Beam Focus Direction is calculated from the respective tolerance compensated frequency component values for said microphone. According to this aspect, there is provided an improved method efficiently compensating microphone tolerances.

According to another aspect, the method further comprises that the temporal averaging of the frequency components is only executed if said frequency component value of said Deviation Spectrum is above a predefined magnitude threshold value. According to this aspect, there is provided an even more efficient technique allowing to temporally average the frequency component values only if considered to be useful depending on the value of the Deviation Spectrum component.

According to another aspect, an apparatus is disclosed for generating a wind noise reduced output signal from sound received by at least two microphones arranged as microphone array. The apparatus comprising at least one processor adapted to perform the methods as discloses therein. According to this aspect, there is provided a Beam Forming apparatus with protection against disturbances caused by wind buffeting.

According to another aspect, the apparatus further comprises at least two microphones.

According to further aspects, there is disclosed a computer program comprising instructions to execute the methods as disclosed therein as well as a computer-readable medium having stored thereon said computer program.

Still other objects, aspects and embodiments of the present invention will become apparent to those skilled in the art from the following description wherein embodiments of the invention will be described in greater detail.

BRIEF DESCRIPTION OF THE DRAWINGS

The invention will be readily understood from the following detailed description in conjunction with the accompanying drawings. As it will be realized, the invention is capable of other embodiments, and its several details are capable of modifications in various, obvious aspects all without departing from the invention.

Figure 1:
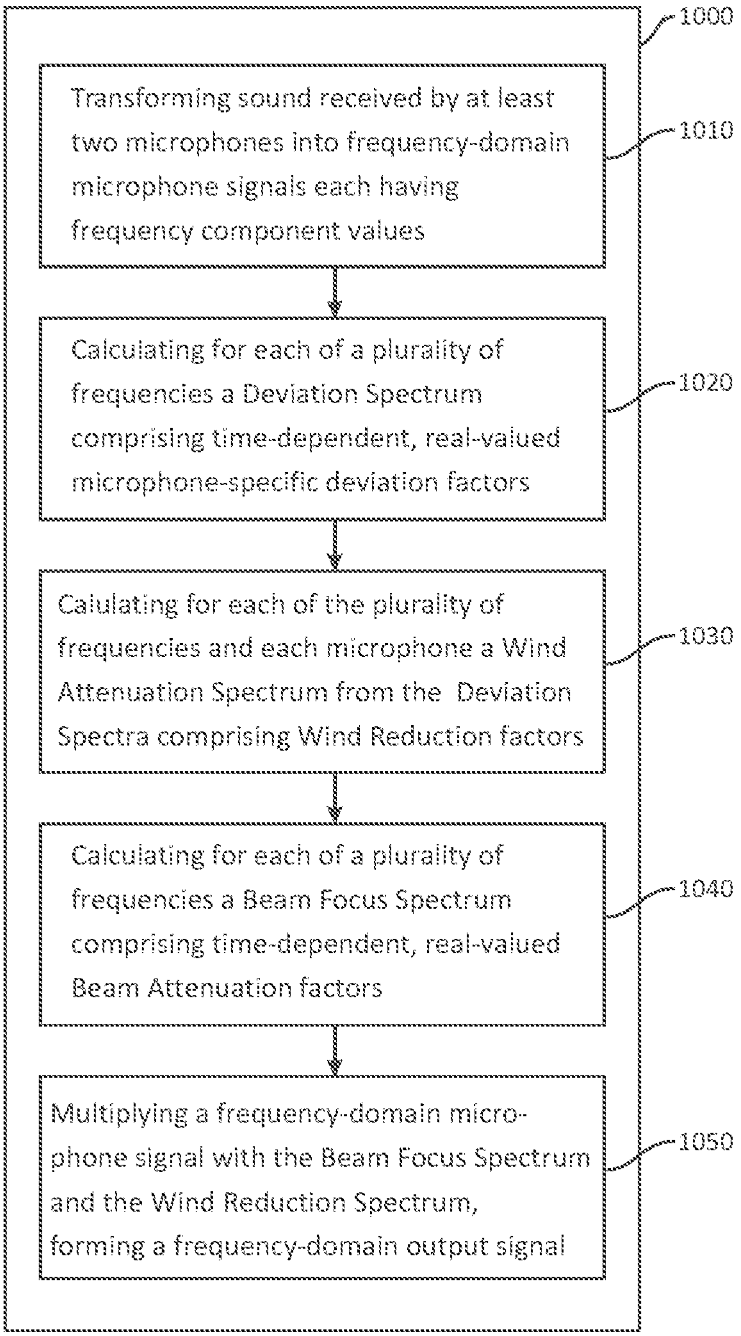
FIG. 1 is a flow diagram illustrating an example method according to an embodiment.

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

DETAILED DESCRIPTION

Introduction

Embodiments as described herein relate to ambient noise-reduction techniques for communications apparatus such as telephone hands-free installations, especially in vehicles, handsets, especially mobile or cellular phones, tablet computers, walkie-talkies, or the like. In the context of the present disclosure, "noise" and "ambient noise" shall have the meaning of any disturbance added to a desired sound signal like a voice signal of a certain user, such disturbance can be noise in the literal sense, and also interfering voice of other speakers, or sound coming from loudspeakers, or any other sources of sound, not considered as the desired sound signal. "Noise Reduction" in the context of the present disclosure shall also have the meaning of focusing sound reception to a certain area or direction, e.g. the direction to a user's mouth, or more generally, to the sound signal source of interest. Such focusing is called Beam Forming in the context of the present disclosure, where the terminus shall exceed standard linear methods often referred to as Beam Forming, too. Beam, Beam Focus, and Beam Focus direction specify the spatial directivity of audio processing in the context of the present invention. "Noise Reduction" in the context of the present disclosure shall especially have the meaning of reducing disturbances caused by wind buffeting on the microphone array.

First of all, however, some terms will be defined and reference symbols are introduced; Symbols in bold represent complexed-valued variables:

$B_i(f)$ Beam Spectrum calculated from two microphones 0 and i=1 . . . n $C(x)$ Beam Focus Characteristic Function, $0 \leq C(x \geq 0) \leq 1$ c Speed of sound d Spatial distance between microphones $D_i(f)$ Deviation Spectrum of microphone with index i=1 . . . n relative to microphone 0

$E_i(f)$ Correction factors for microphone with index i=1 . . . n for tolerance compensation f Frequency of a component of a short-time frequency-domain signal g Beam Forming Exponent g>0, linear Beam Forming when g=1

F(f) Beam Focus Spectrum for a Beam Focus direction $\mathbf{H}_i(f)$ Transfer Function for microphone with index i n Total number of microphones of the array, minus one Number of microphones forming a Beam Focus, minus one $\mathbf{M}_i(f)$ Signal spectrum of microphone with index i, i=0 . . . n W(f) Wind Reduction Spectrum $s_i(t)$ Time-domain signal of microphone with index i $\mathbf{S}(f)$ Beam-Formed frequency-domain signal $\vartheta$ Deviation Threshold of wind buffeting protection, $\vartheta<1$.

All spectra are notated only as frequency-dependent, e.g. S (f), although they also change over time with each newly calculated short-time Fourier Transform. This implicit time dependency is omitted in the nomenclature for the sake of simplicity.

DETAILED DESCRIPTION OF EMBODIMENTS

According to embodiments, there are provided methods and apparatus of protecting from wind buffeting when generating a directional output signal from sound received by at least two microphones arranged as microphone array. The directional output signal has a certain Beam Focus Direction. This certain or desired Beam Focus direction can be adjusted. According to an embodiment, the Beam Focus direction points to an angle from where desired signals are expected to originate. In a vehicle application this is typically the position of the head of the driver, or also the head(s) of other passenger(s) in the vehicle in case their voices are considered as "desired" signals in such application. The method includes transforming sound received by each microphone into a corresponding complex-valued frequency-domain microphone signal and calculating Wind Reduction Factors for each frequency component from said frequency-domain microphone signals. For any Beam Focus Direction a Beam Focus Spectrum is calculated, consisting, for each of the plurality of frequency components, of time-dependent, real-valued attenuation factors being calculated based on the plurality of microphone signals. For each of the plurality of frequency components, the attenuation factor is multiplied with the frequency component of the complex-valued frequency-domain signal of one microphone, forming a frequency-domain directional output signal, from which by means of inverse transformation a time-domain signal can be synthesized.

According to an aspect of embodiments of the present disclosure, there is provided a so-called wind protector which will be described in more detail below and, e.g., with respect to FIG. 6. The wind protector is configured to calculate a Wind Reduction spectrum, which—when multiplied to a microphone spectrum $\mathbf{M}_i(f)$—reduces the unwanted effect of wind buffeting that occurs when wind turbulences hit a microphone.

FIG. 1 shows a flow diagram 1000 illustrating individual processing steps 1010 to 1050 according to a method for generating a directional output signal from sound received by at least two microphones arranged as microphone array according to a first aspect. According to other embodiments, there are two or more microphones arranged closed to each other forming a microphone array to capture sound present in the environment of the microphones. The generated directional output signal has a certain Beam Focus Direction. The microphones are spaced apart and are arranged, e.g., inside a car to pick up voice signals of the driver.

The microphones form a microphone array meaning that the sound signals received at the microphones are processed to generate a directional output signal having a certain Beam Focus direction. According to an embodiment, time-domain signals of two or more microphones being arranged in a microphone array, e.g. inside a car, are converted into time discrete digital signals by analog-to-digital conversion of the signals received by the microphones by means of, e.g., one or more analog-digital converters. Blocks of time discrete digital signal samples of converted time-domain signals are, after preferably appropriate windowing, by using, e.g., a Hann Window, transformed into frequency-domain signals $\mathbf{M}_i(f)$ also referred to as microphone spectra, preferably using an appropriate transformation method like, e.g., Fast Fourier Transformation, (step 1010). $\mathbf{M}_i(f)$ are addressed as complex-valued frequency domain microphone signals distinguished by the frequency f, where i=0 . . . n indicates the microphone, and n+1 is the total number of microphones forming the microphone array. Each of the complex-valued frequency-domain microphone signals comprises a frequency component value for each of a plurality of frequency components, with one component for each frequency f. The frequency component value is a representation of magnitude and phase of the respective microphone signal at a certain frequency f.

According to an embodiment, for each of the complex-valued frequency-domain microphone signals, a Beam Spectrum is calculated in step 1020 for a certain Beam Focus Direction, which is defined, e.g., by the positions of the microphones and algorithmic parameters of the signal processing. According to an embodiment, the Beam Focus Direction points, e.g., to the position of the driver of the car. The Beam Focus Spectrum then comprises, for each of the plurality of frequency components, real-valued attenuation factors. Attenuation factors of a Beam Focus Spectrum are calculated for each frequency component in step 1030.

In a next step 1040, for each of the plurality of frequency components, the attenuation factors are multiplied with the frequency component values of the complex-valued frequency-domain microphone signal of one of said microphones. As a result, a directional frequency component value for each frequency component is obtained. From the directional frequency component values for each of the plurality of frequency components, a frequency-domain directional output signal is formed in step 1050. In other words, the real-valued attenuation factors are calculated to determine how much the respective frequency component values need to be damped for a certain Beam Focus Direction and which can then be easily applied by multiplying the respective real-valued attenuation factors with respective complex-valued frequency components of a microphone signal to generate the directional output signal. Contrary to state of the art Beam Forming approaches, according to the present implementation, it is not required to add or subtract microphone signals, which then often have the disadvantage of losing signal components in the lower frequency bands which need to be compensated with the further disadvantage of lowering the signal to noise ratio. According to the present implementation, the attenuation factors for all frequency components form a kind of real-valued Beam Focus Direction vector which just needs to be multiplied as a factor with the respective Wind Reduction Factor and the respective complex-valued frequency-domain microphone signal to achieve the wind-reduced frequency-domain directional output signal, which is algorithmically simple and robust.

According to an embodiment, a time-domain directional output signal with reduced wind-buffeting disturbance is synthesized from the frequency-domain output signal by means of inverse transformation, using a respective appropriate transformation from the frequency-domain into the time-domain like, e.g., inverse Fast Fourier Transformation.

According to an embodiment, calculating the Beam Focus Spectrum for a respective Beam Focus Direction comprises, for each of the plurality of frequency components of the complex-valued frequency-domain microphone signals of said microphones, to calculate real-valued Beam Spectra values by means of predefined, microphone-specific, time-constant, complex-valued Transfer Functions. The Beam Spectra values are arguments of a Characteristic Function with values between zero and one. The calculated Beam Spectra values for all frequencies f then form the Beam Focus Spectrum for a certain Beam Focus Direction. The Beam Focus Direction can be defined by the positions of the microphones and algorithmic parameters of the Transfer Functions $H_i(f)$.

Another aspect will now be described with reference to FIG. 4 which shows an exemplary processing of the microphone spectra in a Beam Focus Calculator 130 for calculating the Beam Focus Spectra F(f) from signals of two microphones. According to an example, in step 310, predefined complex-valued Transfer Functions $\mathbf{H}_i(f)$ are used. Each Transfer Function $\mathbf{H}_i(f)$ is a predefined, microphone-specific, time-constant complex-valued Transfer Functions for a predefined Beam Focus direction and microphone i. With the predefined complex-valued Transfer Functions $\mathbf{H}_i(f)$ real-valued Beam Spectra values $B_i(f)$ are calculated, where index i identifies the individual microphone. In this manner, the Beam Spectra are associated with pairs of microphones with index 0 and index i. The Beam Spectra values $B_i(f)$ are calculated from the spectra $\mathbf{M}_0(f)$ and $\mathbf{M}_i(f)$ of said pair of microphones and said Transfer Functions as quotient as shown in step 320 of FIG. 4:

$$B_i(f)=|\mathbf{H}_0(f)\mathbf{M}_0(f)+\mathbf{H}_i(f)\mathbf{M}_i(f)E_i(f)|/|\mathbf{M}_0(f)|.$$

In embodiments with more than two microphones forming the Beam Spectrum, the numerator sum of the above quotient contains further products of microphone spectra and Transfer Functions, i.e. the pair of microphones is extended to a set of three or more microphones forming the beam similar to higher order linear Beam Forming approaches.

According to an embodiment, in the Beam Focus calculation, for each of the plurality of frequency components, the calculated Beam Spectra values $B_i(f)$ are then used as arguments of a Characteristic Function. The Characteristic Function with values between zero and one provides the Beam Focus Spectrum for the Beam Focus Direction.

According to an embodiment, the Characteristic Function C(x) is defined for x≥0 and has values C(x)≥0. The Characteristic Function influences the shape of the Beam Focus. An exemplary Characteristic Function is, e.g., $C(x)=x^g$ for x<1, and C(x)=1 for x≥1, with an exponent g>0 making Beam Forming more (g>1) or less (g<1) effective than conventional linear Beam Forming approaches.

According to another embodiment, the Characteristic Function is made frequency-dependent as C(x,f), e.g., by means of a frequency-dependent exponent g(f). Such a frequency-dependent Characteristic Function provides the advantage to enable that known frequency-dependent degradations of conventional Beam Forming approaches can be counterbalanced when providing the Beam Focus Spectrum for the respective Beam Focus Direction.

According to an embodiment, the Beam Spectra $B_i(f)$ are arguments of the Characteristic Functions C(x) forming the Beam Focus Spectrum $F(f)=\Pi_{i=1}^{o}C(B_i(f))$ as shown in step 330. Values of $C(B_i(f))$ of different Beam Spectra are multiplied in case more than one microphone pair (or set) contributes to the Beam Focus Spectrum F(f). In the above formula the number of microphones that pairwise contribute to a Beam Focus is o+1. In case of two microphones with indices 0 and 1 being used (o=1), above formula simplifies to $F(f)=C(B_1(f))$. The Beam Focus Spectrum F(f) is the output of the Beam Focus Calculator, its components are then used as attenuation factors for the respective frequency components.

Figure 4:
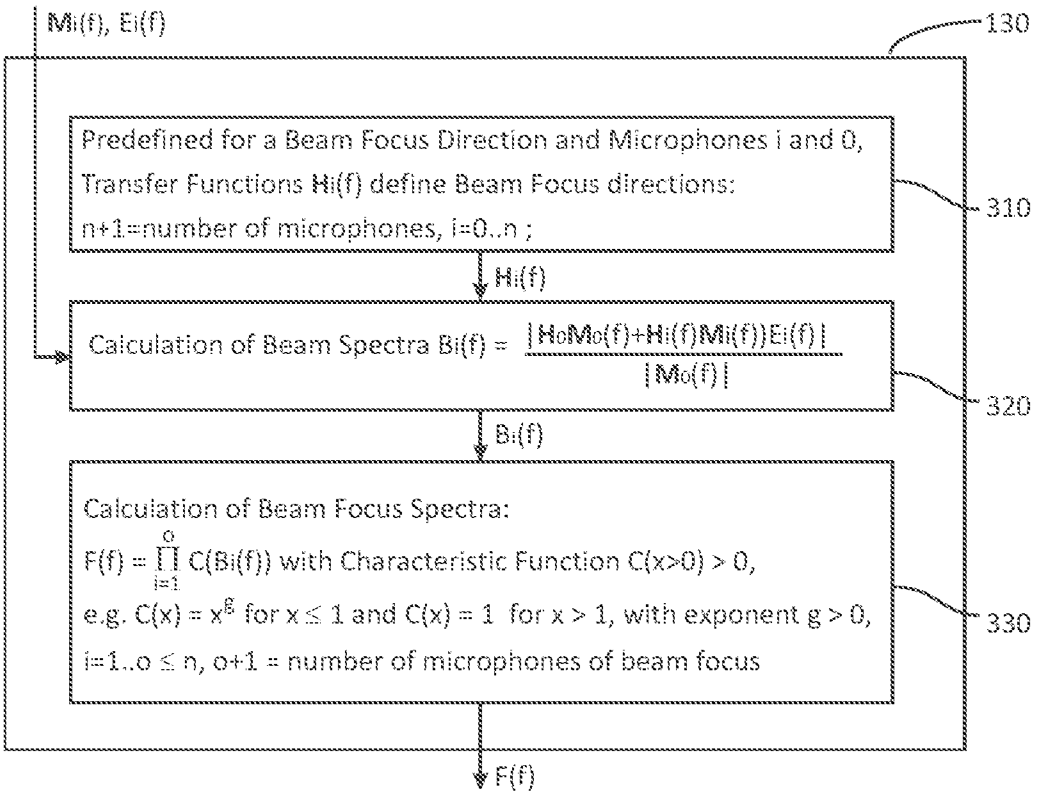
FIG. 4 is a block diagram of an example Beam Focus Calculator which may be used for one of more embodiments described herein.
Figure 5:
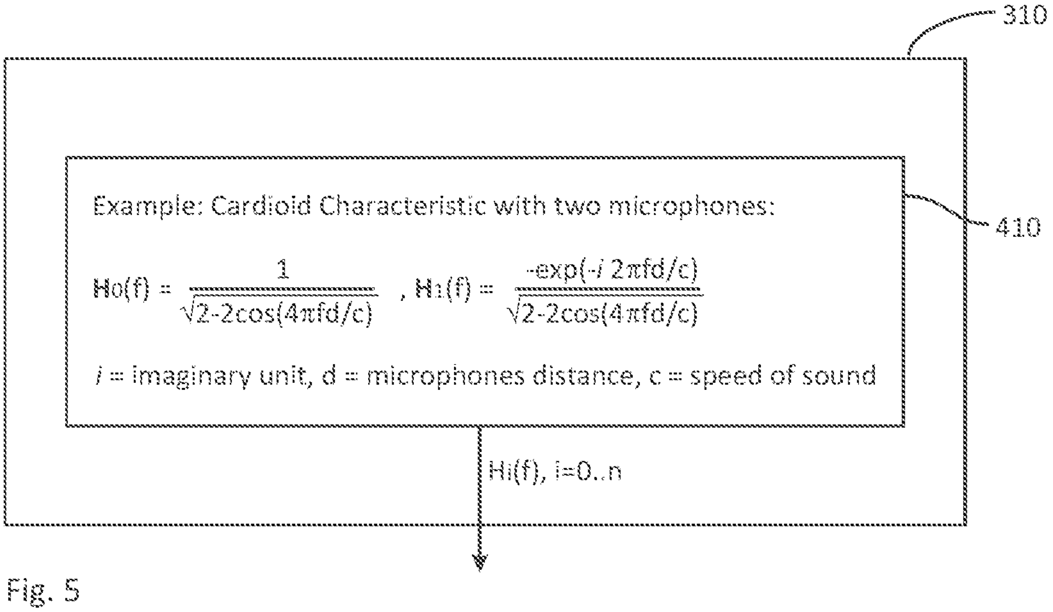
FIG. 5 is a flow diagram illustrating an example method for calculating an example transfer function according to an embodiment

FIG. 5 shows an exemplary calculation of the predefined Transfer Functions $\mathbf{H}_i(f)$ as generally shown in step 310 of FIG. 4 for the calculation of Beam Spectra from signals of two microphones. According to an embodiment as depicted in functional block 410, a so-called cardioid characteristic of angular sensitivity of Beam Forming is achieved with Transfer Functions predefined as $$\mathbf{H}_0=(2-2\cos(4\pi fd/c))^{-1/2} \text{ and } \mathbf{H}_1=-\exp(-i2\pi fd/c)(2-2\cos(4\pi fd/c))^{-1/2},$$

where d denotes the spatial distance of the pair of microphones, c is the speed of sound (343 m/s at 20° C. and dry air), and i denotes the imaginary unit $i^2=-1$ not to be confused with the index i identifying different microphones. As an alternative to such analytic predefinition, Transfer Functions can also be calculated, e.g., by way of calibration as taught in DE 10 2010 001 935 A1 or U.S. Pat. No. 9,330,677.

According to another aspect, the method for generating a directional output signal further comprises steps for compensating for differences among the used microphones also referred to as microphone tolerances. Such compensation is in particular useful since microphones used in applications like, e.g., inside a car often have differences in their acoustic properties resulting in slightly different microphone signals for the same sound signals depending on the respective microphone receiving the sound. In order to cope with such situations, according to an embodiment, for each of the plurality of frequency components, correction factors are calculated, that are multiplied with the complex-valued frequency-domain microphone signals of at least one of the microphones in order to compensate said differences between microphones. The real-valued correction factors are calculated as temporal average of the frequency component values of a plurality of real-valued Deviation Spectra. Each frequency component value of a Deviation Spectrum of the plurality of real-valued Deviation Spectra is calculated by dividing the frequency component magnitude of a frequency-domain reference signal by the frequency component magnitude of the component of the complex-valued frequency-domain microphone signal of the respective microphone. Each of the Beam Focus Spectra for the desired or selected Beam Focus Directions are calculated from the respective tolerance-compensated frequency-domain microphone signals.

According to one embodiment, one of the complex-valued frequency-domain microphone signals of one of the microphones is selected as the frequency domain reference signal. The selection either done by pre-selecting one of the microphones as the reference microphone or automatically during the signal processing and/or depending on certain microphone parameters.

Figure 3:
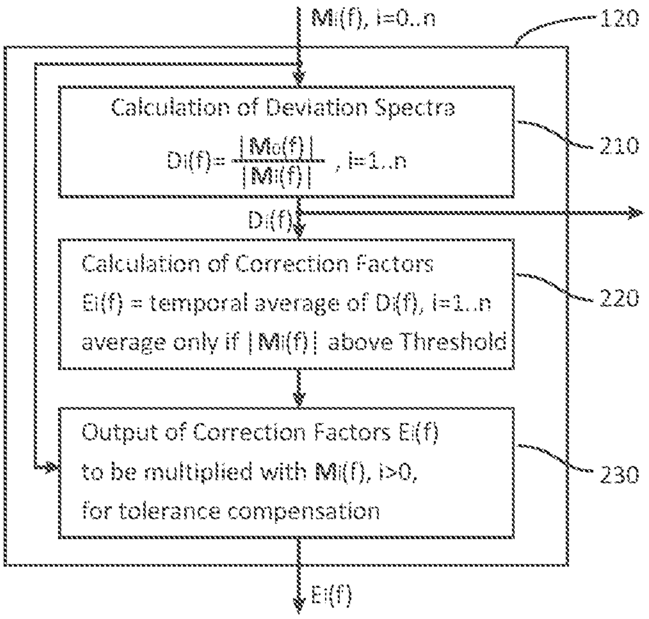
FIG. 3 is a block diagram of an example Microphone Tolerance Compensator which may be used for one of more embodiments described herein.

FIG. 3 shows an embodiment of a tolerance compensator 120 used for the compensation of the microphone tolerances and which is designed to equalize differences amongst the microphones in terms of sensitivity and frequency response relative to a reference being, for example, one microphone of the microphone array which is referred to as reference microphone and identified with the index i=0. For each microphone with index i>0, Deviation Spectra $D_i(f)$ are calculated as quotient of microphone magnitude spectra $|\mathbf{M}_0(f)|$ and $|\mathbf{M}_i(f)|$ for each of the plurality of frequencies, i.e. $D_i(f)=|\mathbf{M}_0(f)|/|\mathbf{M}_i(f)|$, i=1 . . . n, as shown in step 210. Correction factors $E_i(f)$ are then calculated as temporal average of Deviation Spectra $D_i(f)$. According to an embodiment, the average is calculated as moving average of the Deviation Spectra $D_i(f)$. According to an embodiment, the average is calculated with the restriction that the temporal averaging is only executed if $|\mathbf{M}_i(f)|$ is above a selectable magnitude threshold as shown in step 220. The threshold value is tuned such that it is well above the intrinsic noise level of the microphones, so that the average is calculated only for acoustic signals, and not for non-acoustic noise.

According to another embodiment (not shown), the threshold-controlled temporal average is executed individually on $\mathbf{M}_0(f)$ and $\mathbf{M}_i(f)$ prior to their division to calculate the Deviation Spectrum. According to still other embodiments, the temporal averaging itself uses different averaging principles like, e.g., arithmetic averaging or geometric averaging.

In yet another embodiment, all frequency-specific values of the correction factors $E_i(f)$ are set to the same value, e.g. an average of the different frequency-specific values. On the one hand, such a scalar gain factor compensates only sensitivity differences and not frequency-response differences amongst the microphones. On the other hand, such scalar value can be applied as gain factor on the time signal of microphone with index i, instead of the frequency-domain signal of that microphone, making computational implementation easy. Correction factor values $E_i(f)$, $i>0$, calculated in the Tolerance compensator as shown in step 230 are then used to be multiplied with the frequency component values of the complex-valued frequency-domain microphone signal of the respective microphone for tolerance compensation of the microphone. According to an embodiment, the correction factor values are then also used in the Beam Focus Calculator 130 of FIG. 4, to calculate the Beam Spectra based on tolerance compensated microphone spectra, as shown in more detail in step 320.

According to an important aspect of the present disclosure, the method for generating a directional output signal comprises steps for reducing disturbances caused by wind buffeting and in particular in the situation of a microphone array in which only one or at least not all microphones are affected by the turbulent airflow of the wind, e.g. inside a car if a window is open.

According to embodiments as described herein, a wind-reduced directional output signal is generated by calculating, for each of the plurality of frequency components, real-valued Wind Reduction Factors as minima of the reciprocal and non-reciprocal frequency components of said Deviation Spectra. For each of the plurality of frequency components, the Wind Reduction Factors are multiplied with the frequency component values of the frequency-domain directional output signal to form the frequency-domain wind-reduced directional output signal.

Figure 6:
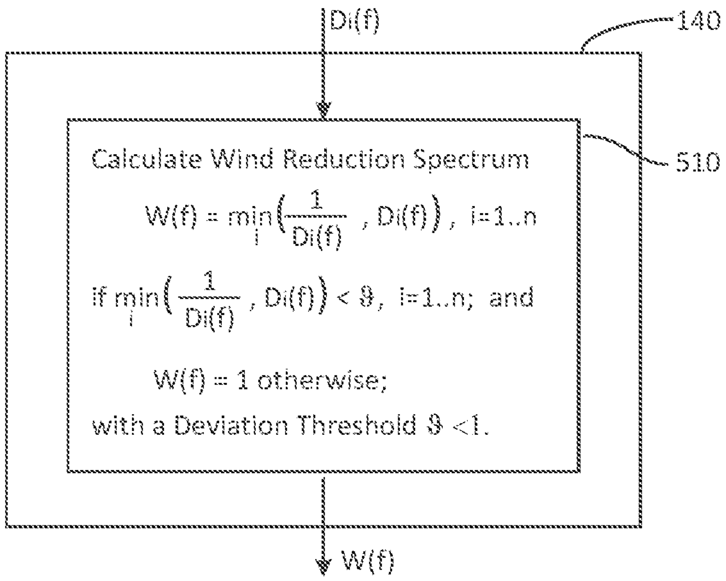
FIG. 6 is a block diagram of an example Wind Protector which may be used for one of more embodiments described herein.

FIG. 6 shows an embodiment of a Wind Protector 140 for generating a wind-reduced output signal. According to an embodiment, the Wind Protector makes use of the Deviation Spectra $D_i(f)$ calculated in the Tolerance Compensator 120. For each of the plurality of frequencies, the minimum of the reciprocal and non-reciprocal values of the Deviation Spectrum components of all microphones except the microphone with index i=0 is calculated in processing step 510, forming the Wind Reduction Spectrum $W(f)=\min_i(D_i(f),1/D_i(f))$ if $\min_i(D_i(f),1/D_i(f))<\vartheta$, and $W(f)=1$ otherwise; $i=1 \ldots n$.

According to an embodiment, a time-domain wind-reduced directional output signal is then synthesized from the frequency-domain wind-reduced directional output signal by means of inverse transformation as described above.

Figure 7:
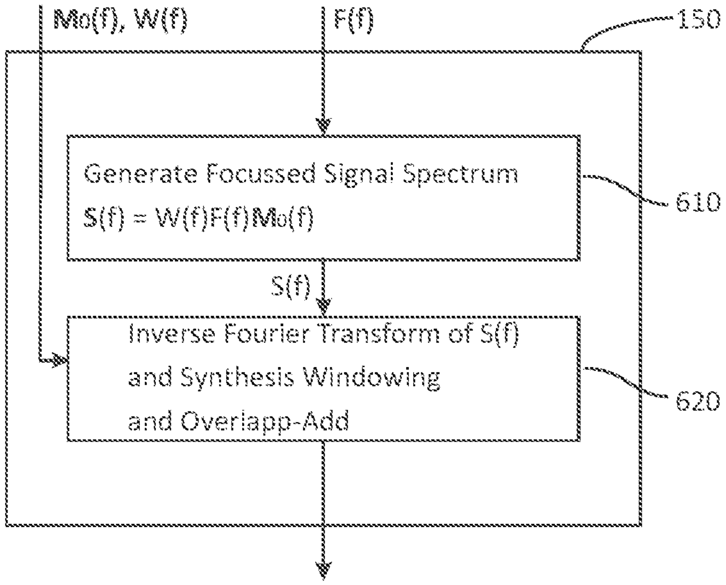
FIG. 7 is a block diagram of an example Time-Signal Synthesizer which may be used for one of more embodiments described herein.

FIG. 7 shows an embodiment of a Time-Signal Generator or Synthesizer 150 according to an embodiment of the present invention. For each of the plurality of frequencies, the Beam Focus Spectrum for the selected Beam Focus direction F(f) is calculated. The components of the Wind Reduction Spectrum W(f) are multiplied with Beam Focus Spectrum F(f) and the complex valued components of the microphone spectrum $\mathbf{M}_0(f)$ of microphone with index zero, forming the directional output signal spectrum $\mathbf{S}(f)=W(f)F(f)\mathbf{M}_0(f)$ in processing step 610.

According to an embodiment, the output signal spectrum S(f) as generated in step 610 is then inversely transferred into the time domain by, e.g., inverse short-time Fourier transformation with suitable overlap-add technique or any other suitable transformation technique in processing step 620.

According to another aspect, there is provided a method and an apparatus for generating a noise reduced output signal from sound received by at least two microphones. The method includes transforming the sound received by the microphones into frequency-domain microphone signals, being calculated by means of short-time Fourier Transform of analog-to-digital converted time signals corresponding to the sound received by the microphones. The method includes a real-valued Wind Reduction Spectrum that is calculated, for each of the plurality of frequency components, from Deviation Spectra describing current magnitude deviations amongst microphones. The method also includes real-valued Beam Spectra, each of which being calculated, for each of the plurality of frequency components, from at least two microphone signals by means of complex-valued Transfer Functions. The method further includes the already discussed Characteristic Function with range between zero and one, with said Beam Spectra as arguments, and multiplying Characteristic Function values of different Beam Spectra in case of a sufficient number of microphones. Characteristic Function values, or products thereof, yield a Beam Focus Spectrum, with a certain Beam Focus direction, which together with the Wind Reduction Spectrum is then used to generate the output signal in the frequency-domain.

The apparatus includes an array of at least two microphones transforming sound received by the microphones into frequency-domain microphone signals of analog-to-digital converted time signals corresponding to the sound received by the microphones. The apparatus also includes a processor to calculate, for each frequency component, Wind Reduction Spectra and Beam Spectra that are calculated from microphone signals with complex-valued Transfer Functions, and a Characteristic Function with range between zero and one and with said Beam Spectra values as arguments of said Characteristic Function, and a directional output signal based on said Characteristic Function values of Beam Spectrum values.

In this manner an apparatus for carrying out an embodiment of the invention can be implemented.

It is an advantage of the embodiments as described herein that they provide a very stable two-(or more) microphone Beam Forming technique, which is able to protect against wind-buffeting.

According to an embodiment, in the method according to an aspect of the invention, said Beam Spectrum is calculated for each frequency component as sum of microphone signals multiplied with microphone-specific Transfer Functions that are complex-valued functions of the frequency defining a direction in space also referred to as Beam Focus direction in the context of the present invention.

According to an embodiment, in the method according to an aspect of the invention, the microphone Transfer Functions are calculated by means of an analytic formula incorporating the spatial distance of the microphones, and the speed of sound. An example for such a transfer functions with cardioid characteristic is provided in functional block 410 of FIG. 5 and further described with respect to FIG. 5 above.

According to another embodiment, in the method according to an aspect of the invention, at least one microphone Transfer Function is calculated in a calibration procedure based on a calibration signal, e.g. white noise, which is played back from a predefined spatial position as known in the art.

A capability to compensate for sensitivity and frequency response deviations amongst the used microphones is another advantage of the present invention. Based on adaptively calculated deviation spectra, tolerance compensation correction factors are calculated, which correct frequency response and sensitivity differences of the microphones relative to a reference.

According to an important aspect of the present disclosure, minimum selection amongst reciprocal and non-reciprocal values of said Deviation Spectra components is used as a robust and efficient measure to calculate Wind Reduction factors, which reduce signal disturbances caused by wind buffeting into the microphones.

The output signal according to an embodiment is used as replacement of a microphone signal in any suitable spectral signal processing method or apparatus.

In this manner a wind-reduced, beam-formed time-domain output signal is generated by transforming the frequency-domain output signal into a discrete time-domain signal by means of inverse Fourier Transform with an overlap-add technique on consecutive inverse Fourier Transform frames, which then can be further processed, or send to a communication channel, or output to a loudspeaker, or the like.

Figure 2:
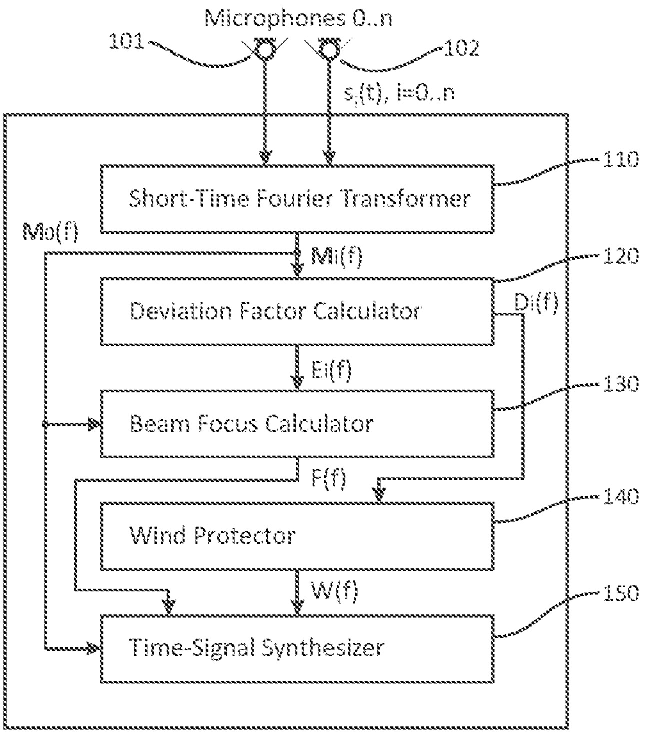
FIG. 2 is a flow diagram illustrating an example method according to an embodiment and also illustrates a block diagram of an example apparatus which may be used for one of more embodiments described herein.

FIG. 2 shows a block diagram of an apparatus according to an embodiment of the present invention, respectively a flow diagram illustrating individual processing steps of a method for generating a noise reduced output signal from sound received by at least two microphones with index i=0 . . . n, exemplarily depicted as microphones 101, and 102, some of the blocks/steps are optional. Respective time-domain signals $s_i(t)$ of the microphones with index i of the two, three, or more spaced apart microphones 101, 102 are converted into time discrete digital signals, and blocks of signal samples of the time-domain signals are, after appropriate windowing (e.g. Hann Window), transformed into frequency-domain signals $\mathbf{M}_i(f)$ also referred to as microphone spectra, using a transformation method known in the art (e.g. Fast Fourier Transform) illustrated as functional block step 110. $\mathbf{M}_i(f)$ are addressed as complex-valued frequency-domain signals distinguished by the frequency f, where i=0 . . . n indicates the microphone, and n+1 is the total number of microphones forming a microphone array according to an aspect of the present disclosure.

According to an embodiment, the microphone tolerance compensator 120, as explained in more detail with respect to FIG. 3, is configured to calculate correction factors $E_i(f)$, i>0, which—when multiplied with the respective microphone spectrum $\mathbf{M}_i(f)$—compensate the differences amongst the microphones with respect to sensitivity and frequency response. Correction factors are calculated with relation to a reference, which can be one of the microphones of the array, or an average of two or more microphones. For the sake of simplicity the reference spectrum is referred to as $\mathbf{M}_0(f)$ in this description. Application of said tolerance compensation correction factors is however considered as optional.

According to an embodiment, the Beam Focus Calculator 130 as explained in more detail with respect to FIG. 4, is configured to calculate the real-valued Focus Spectrum F(f) for the selected Beam Focus direction.

According to an embodiment, the Wind Protector 140 as explained in more detail with respect to FIG. 6, is configured to calculate the Wind Reduction spectrum, which—when multiplied to a microphone spectrum $\mathbf{M}_i(f)$—reduces the unwanted effect of wind buffeting that occurs when wind turbulences hit a microphone.

In the Time Signal Generator or Synthesizer 150 a beam-formed time-domain signal is created by means of a frequency-time domain transformation. For example, state of the art transformation methods such as inverse short-time Fourier transform with suitable overlap-add technique are applied. The time-domain signal can be further processed in any way known in the art, e.g. sent over information transmission channels, or the like.

As already described above, threshold-controlled temporal average is executed individually on $\mathbf{M}_0(f)$ and $\mathbf{M}_i(f)$ prior to their division. Temporal averaging itself has also different embodiments, e.g. arithmetic average or geometric average as well-known in the art.

As already described above, all frequency-specific values of $E_i(f)$ are set to the same value, e.g. an average of the different frequency-specific values. This scalar value can be applied as gain factor not only to the frequency-domain microphone signals but also on the time signal of microphone with index i. However, such a gain factor compensates only sensitivity differences and not frequency-response differences amongst the microphones. Correction factors $E_i(f)$, i>0, are calculated in the Tolerance compensator (step 230), and optionally used in the Beam Focus Calculator (step 320).

As already described above, the Beam Focus calculation comprises the Characteristic Function C(x) which is defined for x≥0 and has values C(x)≥0. The Characteristic Function influences the shape of the Beam Focus, an exemplary Characteristic Function is $C(x)=x^g$ for x<1, and C(x)=1 for x≥1, with an exponent g>0 making Beam Forming more (g>1) or less (g<1) effective than conventional linear Beam Forming. Here it is also possible to make the Characteristic Function frequency-dependent as C(x,f), e.g. by means of a frequency-dependent exponent g(f). Known frequency-dependent degradations of conventional Beam Forming approaches can be counterbalanced by this means.

As already described above, Beam Spectra $B_i(f)$ are arguments of the Characteristic Functions C(x) forming the Beam Focus Spectrum $F(f)=\Pi_{i=1}^{o}C(B_i(f))$ (step 330). Values of $C(B_i(f))$ of different Beam Spectra are multiplied in case more than one microphone pair (or set) contributes to the Beam Focus Spectrum F(f). In the above formula the number of microphones that pairwise contribute to a beam focus is o+1. In case one two microphones with indices 0 and 1 are used (o=1), above formula simplifies to $F(f)=C(B_1(f))$. The Beam Focus Spectrum F(f) is the output of the Beam Focus Calculator.

As already described above, FIG. 7 shows an embodiment of the Time-Domain Signal Generator. According to a similar embodiment, for each of the plurality of frequencies, the components of the Beam Focus Spectrum F(f) are only optionally multiplied with the components of the Wind Reduction Spectrum W(f) and are then multiplied with the complex-valued components of the microphone spectrum $\mathbf{M}_0(f)$ of microphone with index zero, forming the output signal spectrum $\mathbf{S}(f)=W(f)F(f)\mathbf{M}_0(f)$ (step 610). In step 620, the spectrum $\mathbf{S}(f)$ is then inversely transformed into a time domain signal as the output of the Time Signal Generator.

As already described above, $\mathbf{M}_0(f)$ is the frequency-domain signal of a sum or mixture or linear combination of signals of more than one of the microphones of an array, and not just this signal of one microphone with index 0.

The methods as described herein in connection with embodiments of the present invention can also be combined with other microphone array techniques, where at least two microphones are used. The output signal of one of the embodiments as described herein can, e.g., replace the voice microphone signal in a method as disclosed in U.S. Ser. No. 13/618,234. Or the output signals are further processed by applying signal processing techniques as, e.g., described in German patent DE 10 2004 005 998 B3, which discloses methods for separating acoustic signals from a plurality of acoustic sound signals. As described in German patent DE 10 2004 005 998 B3, the output signals are then further processed by applying a filter function to their signal spectra wherein the filter function is selected so that acoustic signals from an area around a preferred angle of incidence are amplified relative to acoustic signals outside this area.

Another advantage of the described embodiments is the nature of the disclosed inventive methods and apparatus, which smoothly allow sharing processing resources with another important feature of telephony, namely so called Acoustic Echo Cancelling as described, e.g., in German patent DE 100 43 064 B4. This reference describes a technique using a filter system which is designed to remove loudspeaker-generated sound signals from a microphone signal. This technique is applied if the handset or the like is used in a hands-free mode instead of the standard handset mode. In hands-free mode, the telephone is operated in a bigger distance from the mouth, and the information of the noise microphone is less useful. Instead, there is knowledge about the source signal of another disturbance, which is the signal of the handset loudspeaker. This disturbance must be removed from the voice microphone signal by means of Acoustic Echo Cancelling. Because of synergy effects between the embodiments of the present invention and Acoustic Echo Cancelling, the complete set of required signal processing components can be implemented very resource-efficient, i.e. being used for carrying out the embodiments described therein as well as the Acoustic Echo Cancelling, and thus with low memory- and power-consumption of the overall apparatus leading to low energy consumption, which increases battery life times of such portable devices. Acoustic Echo cancelling is only required to be carried out on one microphone (with index i=0), instead of all microphones of an array, as required by conventional Beam Forming approaches.

It will be readily apparent to the skilled person that the methods, the elements, units and apparatuses described in connection with embodiments of the present invention may be implemented in hardware, in software, or as a combination thereof. Embodiments of the invention and the elements of modules described in connection therewith may be implemented by a computer program or computer programs running on a computer or being executed by a microprocessor, DSP (digital signal processor), or the like. Computer program products according to embodiments of the present invention may take the form of any storage medium, data carrier, memory or the like suitable to store a computer program or computer programs comprising code portions for carrying out embodiments of the invention when being executed. Any apparatus implementing the invention may in particular take the form of a computer, DSP system, hands-free phone set in a vehicle or the like, or a mobile device such as a telephone handset, mobile phone, a smart phone, a PDA, tablet computer, or anything alike.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method of generating of a wind-reduced output signal from sound received by at least two microphones arranged as microphone array, said method comprising:

transforming the sound received by each of said microphones and represented by analog-to-digital converted time-domain signals provided by each of said microphones into corresponding complex-valued frequency-domain microphone signals each having a frequency component value for each of a plurality of frequency components, wherein one of said complex-valued frequency-domain microphone signals is selected as a frequency domain reference signal, the method further comprising:

calculating, for each of the plurality of frequency components, real-valued Wind Reduction Factors as minima of the reciprocal and non-reciprocal frequency components of a plurality of real-valued Deviation Spectra if said minimum is below a preselected deviation threshold and set to one if said minimum is above or equal to said deviation threshold;

wherein, for each of the plurality of frequency components, each frequency component value of a Deviation Spectrum of said plurality of real-valued Deviation Spectra is calculated by dividing the frequency component magnitude of said frequency-domain reference signal by the frequency component magnitude of the complex-valued frequency-domain microphone signal of said microphone; and for each of the plurality of frequency components, said Wind Reduction Factors are multiplied with the frequency component values of said frequency-domain reference signal, forming a frequency-domain wind-reduced output signal.

2. The method of claim 1, further comprising:

calculating from the complex-valued frequency-domain microphone signals for a Beam Focus Direction a Beam Focus Spectrum by means of a Characteristic Function with values between zero and one, said Beam Focus Spectrum comprises, for each of the plurality of frequency components, a time-dependent, real-valued attenuation factor;

multiplying, for each of the plurality of frequency components, the attenuation factor with the frequency component value of said complex-valued frequency-domain reference signal and with said Wind Reduction Factor to obtain a directional, wind-reduced frequency component value; and forming a frequency-domain directional wind-reduced output signal from the wind-reduced directional frequency component values for each of the plurality of frequency components.

3. The method of claim 1, further comprising calculating a linear combination of the microphone signals of said microphones; and wherein, in the multiplying, the attenuation factor is multiplied with the frequency component value of the complex-valued frequency-domain microphone signal of the linear combination of the microphone signals.

4. The method of claim 3, wherein a time-domain wind-reduced directional output signal is synthesized from the frequency-domain wind-reduced directional output signal by means of inverse transformation.

5. The method of claim 1, wherein calculating the Beam Focus Spectra further comprises:

calculating, for each of the plurality of frequency components, a real-valued Beam Spectra value from the complex-valued frequency-domain microphone signals for the Beam Focus Direction by means of predefined, microphone-specific, time-constant, complex-valued Transfer Functions; and wherein, for each of the plurality of frequency components, said Beam Spectra value is an argument of said Characteristic Function, providing a Beam Focus Spectrum for said Beam Focus Direction.

6. The method of claim 5, wherein said Transfer Functions are calculated by means of an analytic formula incorporating the spatial distance of the microphones, and the speed of sound.

7. The method of claim 1, further comprising:

calculating, for each of the plurality of frequency components of the complex-valued frequency-domain microphone signal of at least one of said microphones, a respective tolerance compensated frequency component value by multiplying the frequency component value of the complex-valued frequency-domain microphone signal of said microphone with a real-valued correction factor;

wherein, for each of the plurality of frequency components, said real-valued correction factor is calculated as temporal average of frequency component values of the plurality of said Deviation Spectra; and wherein the Beam Focus Spectrum for a Beam Focus Directions is calculated from the respective tolerance compensated frequency component values for said microphone.

8. The method of claim 5, wherein said temporal averaging of the frequency component values is only executed if said frequency component value of said Deviation Spectrum is above a predefined magnitude threshold value.

9. The method of claim 2, wherein, when the Beam Focus Spectrum for the respective Beam Focus Direction is provided, for each of the plurality of frequency components, Characteristic Function values of different Beam Spectra are multiplied.

10. An apparatus for generating a directional output signal from sound received by at least two microphones arranged as microphone array, said apparatus comprising at least one processor adapted to perform:

transforming the sound received by each of said microphones and represented by analog-to-digital converted time-domain signals provided by each of said microphones into corresponding complex-valued frequency-domain microphone signals each having a frequency component value for each of a plurality of frequency components, wherein one of said complex-valued frequency-domain microphone signals is selected as a frequency domain reference signal;

calculating, for each of the plurality of frequency components, real-valued Wind Reduction Factors as minima of the reciprocal and non-reciprocal frequency components of a plurality of real-valued Deviation Spectra if said minimum is below a preselected deviation threshold and set to one if said minimum is above or equal to said deviation threshold;

wherein, for each of the plurality of frequency components, each frequency component value of a Deviation Spectrum of said plurality of real-valued Deviation Spectra is calculated by dividing the frequency component magnitude of said frequency-domain reference signal by the frequency component magnitude of the complex-valued frequency-domain microphone signal of said microphone; and for each of the plurality of frequency components, said Wind Reduction Factors are multiplied with the frequency component values of said frequency-domain reference signal, forming a frequency-domain wind-reduced output signal.

11. The apparatus of claim 10, further comprising said at least two microphones.

12. An apparatus comprising processing means for carrying out the method of claim 1.

13. One or more non-transitory computer-readable media having instructions stored thereon, the instructions for generating of a wind-reduced output signal from sound received by at least two microphones arranged as microphone array, and the instructions to cause one or more processors to perform the following operations:

transforming the sound received by each of said microphones and represented by analog-to-digital converted time-domain signals provided by each of said microphones into corresponding complex-valued frequency-domain microphone signals each having a frequency component value for each of a plurality of frequency components, wherein one of said complex-valued frequency-domain microphone signals is selected as a frequency domain reference signal, the method further comprising:

calculating, for each of the plurality of frequency components, real-valued Wind Reduction Factors as minima of the reciprocal and non-reciprocal frequency components of a plurality of real-valued Deviation Spectra if said minimum is below a preselected deviation threshold and set to one if said minimum is above or equal to said deviation threshold;

wherein, for each of the plurality of frequency components, each frequency component value of a Deviation Spectrum of said plurality of real-valued Deviation Spectra is calculated by dividing the frequency component magnitude of said frequency-domain reference signal by the frequency component magnitude of the complex-valued frequency-domain microphone signal of said microphone; and for each of the plurality of frequency components, said Wind Reduction Factors are multiplied with the frequency component values of said frequency-domain reference signal, forming a frequency-domain wind-reduced output signal.

14. The one or more non-transitory computer-readable media of claim 13, wherein the operations further comprise:

calculating from the complex-valued frequency-domain microphone signals for a Beam Focus Direction a Beam Focus Spectrum by means of a Characteristic Function with values between zero and one, said Beam Focus Spectrum comprises, for each of the plurality of frequency components, a time-dependent, real-valued attenuation factor;

multiplying, for each of the plurality of frequency components, the attenuation factor with the frequency component value of said complex-valued frequency-domain reference signal and with said Wind Reduction Factor to obtain a directional, wind-reduced frequency component value; and forming a frequency-domain directional wind-reduced output signal from the wind-reduced directional frequency component values for each of the plurality of frequency components.

15. The one or more non-transitory computer-readable media of claim 13, wherein the operations further comprise:

calculating a linear combination of the microphone signals of said microphones; and wherein, in the multiplying, the attenuation factor is multiplied with the frequency component value of the complex-valued frequency-domain microphone signal of the linear combination of the microphone signals.

16. The one or more non-transitory computer-readable media of claim 15, wherein a time-domain wind-reduced directional output signal is synthesized from the frequency-domain wind-reduced directional output signal by means of inverse transformation.

17. The one or more non-transitory computer-readable media of claim 13, wherein calculating the Beam Focus Spectra further comprises:

calculating, for each of the plurality of frequency components, a real-valued Beam Spectra value from the complex-valued frequency-domain microphone signals for the Beam Focus Direction by means of predefined, microphone-specific, time-constant, complex-valued Transfer Functions; and wherein, for each of the plurality of frequency components, said Beam Spectra value is an argument of said Characteristic Function, providing a Beam Focus Spectrum for said Beam Focus Direction.

18. The one or more non-transitory computer-readable media of claim 17, wherein said Transfer Functions are calculated by means of an analytic formula incorporating the spatial distance of the microphones, and the speed of sound.

19. The one or more non-transitory computer-readable media of claim 13, wherein the operations further comprise:

calculating, for each of the plurality of frequency components of the complex-valued frequency-domain microphone signal of at least one of said microphones, a respective tolerance compensated frequency component value by multiplying the frequency component value of the complex-valued frequency-domain microphone signal of said microphone with a real-valued correction factor;

wherein, for each of the plurality of frequency components, said real-valued correction factor is calculated as temporal average of frequency component values of the plurality of said Deviation Spectra; and wherein the Beam Focus Spectrum for a Beam Focus Directions is calculated from the respective tolerance compensated frequency component values for said microphone.

20. The one or more non-transitory computer-readable media of claim 17, wherein said temporal averaging of the frequency component values is only executed if said frequency component value of said Deviation Spectrum is above a predefined magnitude threshold value.

* * * * *